United States Patent [19]
Thomas et al.

[11] Patent Number: 6,120,739
[45] Date of Patent: Sep. 19, 2000

[54] AUTOMATED PURIFICATION OF AIR WITH OZONE

[75] Inventors: Robert Malcom Thomas; Karl Frederick Thomas, both of Alvin, Tex.

[73] Assignee: Marhoc, Inc., Alvin, Tex.

[21] Appl. No.: 08/885,985

[22] Filed: Jun. 30, 1997

[51] Int. Cl.[7] ...................................................... B01J 19/12
[52] U.S. Cl. .............................. 422/186.07; 422/186.14; 422/186.15
[58] Field of Search .................. 422/186.07, 186.14, 422/186.15

[56] References Cited

U.S. PATENT DOCUMENTS

| | | | |
|---|---|---|---|
| 4,343,765 | 8/1982 | Elston et al. | 422/3 |
| 5,173,268 | 12/1992 | Weaver | 422/186.15 |
| 5,501,844 | 3/1996 | Kasting, Jr. et al. | 422/186.15 |

*Primary Examiner*—Daniel J. Jenkins
*Attorney, Agent, or Firm*—Fulbright & Jarworski LLP

[57] ABSTRACT

An automated air treating apparatus and method therefor for purifying ambient air with ozone. Ozonized air is added to the return air stream of an air handling system and automatically circulated throughout the air handling system and returned to the ambient air.

13 Claims, 2 Drawing Sheets

AUTOMATED PURIFICATION OF AIR WITH OZONE

BACKGROUND

This invention relates to apparatus and methods for treating air with ozone. More specifically, this invention relates to apparatus and methods for automatically purifying and deodorizing air by adding ozone to air handling systems.

Many attempts have been made to reduce offensive odors and infectious agents in enclosed spaces. The methods include disinfecting agents, odor masking agents, activated chemical filters and oxidants. Ozone is a well known oxidant. Ozone, or $O_3$, is an allotropic form of oxygen produced from air or other gasses containing oxygen by passage of a stream of such gasses through a high voltage electrical discharge. The benefits of ozone are well known and include the destruction of bacteria, viruses and other microorganisms on contact and reduction in unpleasant odors.

Various apparatus and methods have been proposed for using ozone to purify ambient air. In general, the ozone generators have taken two forms. In a first form, the generators comprise a portable unit, which is readily moved from room to room. In a second form, the generators have been included in air handling systems and operate on a passive basis which is controlled by the operation of the air handling system.

An example of the first type includes U.S. Pat. No. 5,501,844. U.S. Pat. No. 5,501,844 discloses a portable apparatus which treats ambient air in an enclosed space with ozone. The shorting coming of such invention includes its ability to treat only a limited portion of the ambient air within a limited area of an enclosed space.

Examples of the second type of apparatus include U.S. Pat. No. 4,343,765 and U.S. Pat. No. 5,173,268. The limitation of these references includes their passive nature. Each system effectively treats ambient air only when the air handling system is activated by the thermostat for heating or cooling.

Thus, a need remains for air purification systems and methods that utilize ozone which effectively purifies enclosed air.

SUMMARY OF INVENTION

It is therefore an object of the present invention to provide an automated system that purifies and deodorizes ambient air with ozone.

It is a further object of the present invention to provide a means for programming the output of an automated ozone air purification system.

Another object of the present invention is to provide an automated ozone air purification system that utilizes existing air handling apparatus.

Yet another object of the present invention is to provide an automated ozone air purification method which utilizes existing air handling apparatus and creates an effective concentration of ozone to purify ambient air.

Thus to achieve these objects, there is provided in one aspect of the present invention an ozone generating means, means to activate the existing air handling apparatus, and means for controlling the ozone generating device. More particularly, there is provided a device which generates an effective concentration of ozone, and logic circuitry which is programmable and operates both the ozone generator and the blower motor of the existing air handling system. Preferably, the logic circuitry comprises either a microprocessor and data entry switches or a keypad, or an on/off cycling timer relay and a programmable time delay relay.

In a preferred embodiment, the proper ozone generation and flow is maintained in accordance with the ozone generator's output and the volume of an enclosed space. For the purposes of the present invention, an enclosed space includes but is not limited to a dwelling, residence, facility, bar, theater or like enclosed structure.

In another preferred embodiment, the ozone generator produces a concentration of ozone from about 0.1 to 0.9 PPM. Most preferred, the ozone generator produces a concentration of about 0.2 to 0.4 PPM. The air handling unit's and ozone generator's operation time is varied to produce preferred concentration of ozone in the ambient air.

In yet another preferred, there is provided an ozone generator and control circuitry which operates an existing air handling apparatus and the ozone generator. Preferably the control circuitry operates the air handling apparatus and ozone generator on a periodic basis.

In yet another embodiment of the preset invention there is provided a method for controlling and intermittently introducing ozone into the return air of an air handling apparatus and controlling the operation of the ozone generator and air handling apparatus. Preferably the ozone generator and air handling system is controlled to operate on a periodic basis. Most preferred, the method introduces a concentration of ozone from about 0.1 to 0.9 PPM.

The present invention thus provides advantages over existing apparatus and methods by providing an automated apparatus and method for purifying air throughout an enclosed space with ozone.

Other objects, features and advantages of the present invention will become apparent from a review of the detailed description of the preferred embodiments, including the illustrative example, and the appended claims that follow.

DETAILED DESCRIPTION OF THE INVENTION

The present invention provides a unique, automatic method and apparatus, which may be readily incorporated into an existing air handling system, for purifying and deodorizing air in an enclosed space with ozone. In contrast with known apparatus and methods, the present invention effectively purifies and deodorizes the air throughout an enclosed space, as opposed to a limited confined space, and is not dependent upon the operation of the air handling system's efforts to modify climate conditions.

As discussed above, ozone is an active oxidizing agent that destroys bacteria, viruses and other microorganisms on contact. Low levels of ozone are excellent for eliminating unpleasant odors and destroying pollen and dust particles. Ozone is used as it is generated, breaks down rapidly and has a relatively short half life.

Because of the benefits of ozone, it is preferred to produce and maintain ozone concentrations on a continuous and automated basis. Ozone, however, may be toxic in sufficient concentrations over sufficient time periods. Limits have been established by NIOSH for both long term and short term exposure. The preferred concentration and examples herein are designed to conform with present NIOSH standards. Variation of concentrations and operation of the present invention for other applications would be obvious to those skilled in the art.

As mentioned above, the unique air purification apparatus disclosed herein may be controlled by a variety of different means. An off/off cycling timer will be discussed for purposes of illustration. The following embodiments, illustrations and examples are shown for the purpose of illustration, not limitation. Other embodiments, illustrations and examples will be readily apparent to those skilled in the art.

Figure 1:
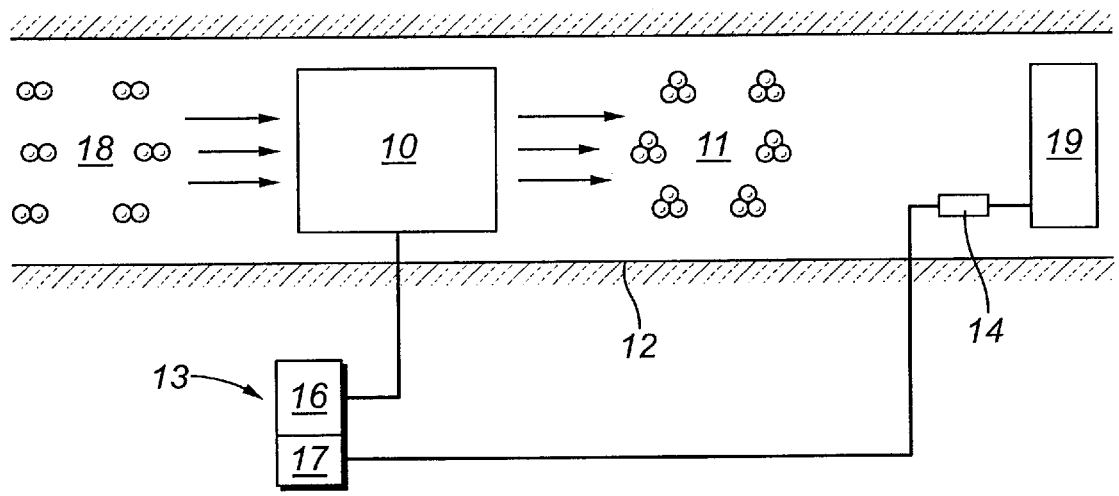
FIG. 1 is a schematic figure showing a preferred embodiment of the present invention.

According to one embodiment as shown in FIG. 1, an ozone generator 10 is placed in the return air enclosure 11 of an air handling system 12. The control circuitry 13 is electrically connected to the blower motor control circuitry 14 and the ozone generator 10. In a preferred embodiment the control circuitry 14 comprises a twenty four hour cycling on/off timer 16 and a time delay relay 17.

A suitable cycling on/off timer 16 is manufactured by Intermatic Inc., Spring Grove, Ill. Preferably, the timer 16 incorporates a time delay relay 17 which allows for finer adjustment of run times. Suitable time delay relays are manufactured by Potter-Brumfield, Princeton, N.J.

In a preferred embodiment, the control circuitry 13 is programmed to activate the invention for a proper time duration. For example, in a most preferred embodiment, the invention is operated only once every two hours. As discussed above, ozone has a relatively short half life. By operating the system once every two hours, ozone generated in one operation cycle effectively dissipates before the subsequent operation cycle. By operating the system on a two hour time period, exposure concerns are thus reduced and efficiency improved.

Operation time of the invention for each two hour interval is determined based upon the volume of air within an enclosed space, the ozone generator's output of ozone, and the desired ozone limit in the ambient air. The proper run time is calculated by multiplying the dwelling space by the desired ozone limit and dividing this product by the ozone generator's output rate. The calculations are preferably made to ensure that ozone in the ambient air is within limits prescribed by NIOSH. Other applications and concentrations would be readily apparent to those skilled in the art.

Because the volume of air to be treated in a dwelling is larger than that of a single room, it is preferred that the ozone generator produce a concentration of ozone from about 0.1 to 0.9 PPM. Most preferred is an ozone generator which produces a concentration of ozone from about 0.2 to 0.4 PPM. Such concentrations effectively purify and deodorize ambient air without adverse effects. Examples of such generators are available, for example, from Marhoc, Inc., Alvin, Tex. By using the preferred ozone generator, energy efficiency is improved because the system may be operated for a shorter time period.

Figure 2:
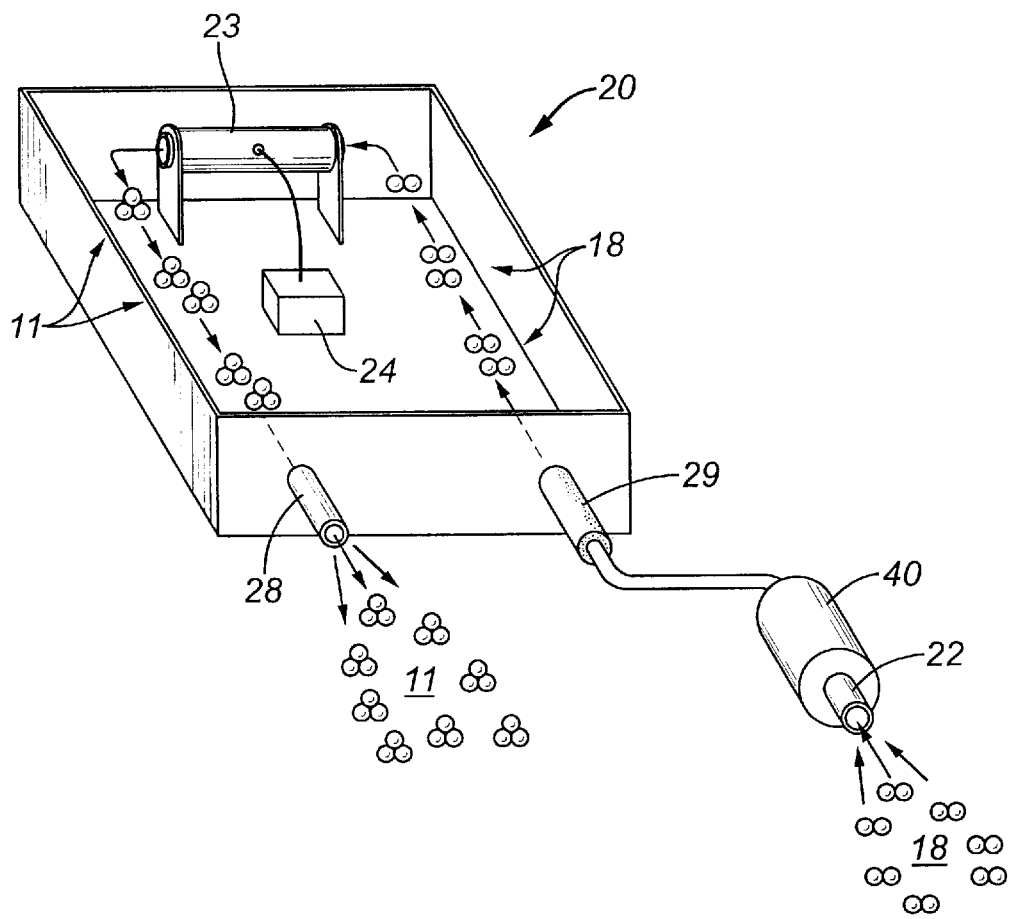
FIG. 2 is a perspective view taken from the front of the ozone generating unit.

Referring now to FIG. 2, an ozone generator which produces concentrations of ozone in the preferred ranges is provided. Compressor 40 draws air 18 into air inlet 22 and pushes air 18 past reactor 23. The air 18 passes reactor 23. Transformer 24 creates a high voltage across reactor 23. As air 18 passes through reactor 23, ozone 11 is created and passes out air outlet 28.

Preferably, water vapor is removed from air drawn by the compressor 23. Silica gel 29 is a suitable means to remove water vapor.

Figure 3:
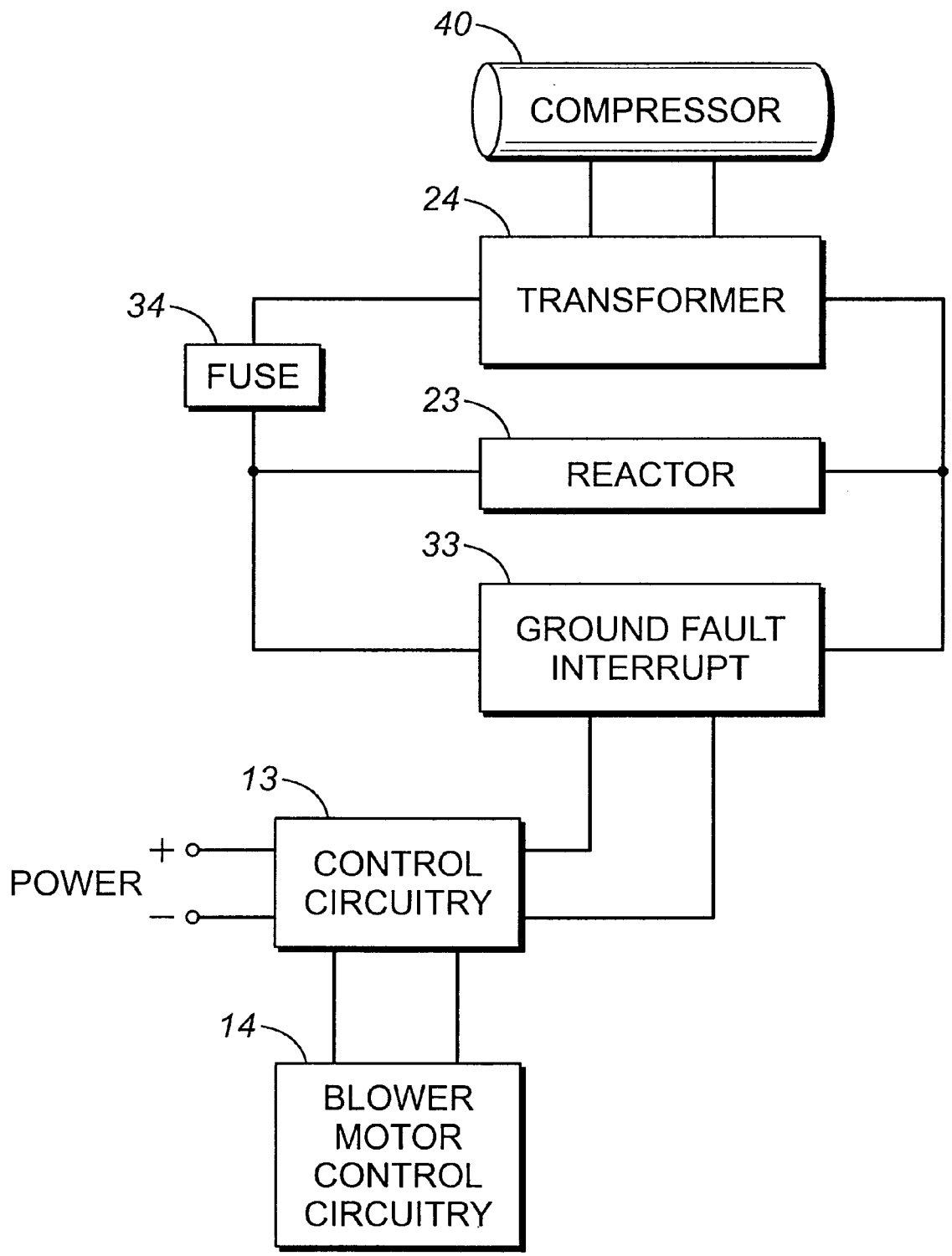
FIG. 3 is a simplified electrical diagram for the preferred embodiment shown in FIG. 1.

Referring to FIG. 3, the electrical circuitry of the preferred embodiment is illustrated. Compressor 40 and transformer 24 are wired in parallel. Ground fault interrupt 33 protects compressor 23 and transformer 24. Fuse 34 provides additional protection for the transformer 24. The high side of transformer 24 is connected to reactor 23. When control circuitry 13 activates, power is provided to compressor 23, transformer 24 and blower motor control circuitry 14. Air 18 is drawn through ozone generator 10 and blower motor 19 circulates ozone 11 throughout the air handling system and the dwelling.

Operation of a preferred embodiment is further illustrated by the following example:

EXAMPLE

An air purifying apparatus as described above and as represented in the drawings was placed in the return air duct of an air handling system. The ozone generator output approximately 0.017 g of ozone per minute. The volume of the structure was approximately four hundred and fifty cubic meters. Using a desired ozone concentration of 0.0006 g per cubic meter, the proper run time was calculated to be sixteen minutes.

A cycling on/off timer and time delay relay were programmed to operate the system once every two hours for a duration of sixteen minutes. Based upon such settings, the ozone generator did not exceed 0.0006 g per cubic meter over a thirty-day period.

The present invention, therefore, is well adapted to carrying out the objects and obtain the ends and advantages mentioned, as well as others inherent herein. All presently preferred embodiments of the invention have been given for the purposes of disclosure. Numerous changes in the detail of construction may be made which will readily suggest themselves to those skilled in the art and which are encompassed within the spirit of the invention and the scope of the appended claims.

What is claimed is:

1. An automated ozone generation system comprising:
   an ozone generator integrated into the air handling apparatus of a facility, wherein said facility comprises a volume of enclosed air and said air handling apparatus comprises a blower-motor and an air stream created by the activation of said blower-motor, whereby said ozone generator intermittently introduces ozone into said air stream and said air handling apparatus circulates said ozone throughout said air handling apparatus and said facility;
   means for controlling the operation of said ozone generator; and
   means for activating said blower motor.

2. The system of claim 1, wherein said means for controlling is programmed based upon said volume of enclosed air, a desired ozone concentration and the ozone output of said ozone generator, whereby said concentration of ozone in said volume of enclosed air is increased to from about 0.1 to 0.2 PPM.

3. The system of claim 1, wherein said ozone generator comprises an air inlet an air outlet and a means for removing water vapor from air which enters said air inlet.

4. The system of claim 3, wherein said means for removing is silica gel.

5. An apparatus for treating the enclosed air of a facility with ozone comprising:
   an ozone generator integrated into an air handling apparatus of a facility, wherein said facility comprises a volume of enclosed air, whereby said air handling apparatus circulates generated ozone throughout said air handling apparatus and said volume of air; and control circuitry which operates said ozone generator and said air handling apparatus on a time varying basis, whereby said concentration of ozone in said volume of air is increased to from about 0.1 to 0.2 PPM.

6. A method for introducing a concentration of ozone into the ambient air of a facility and an air handling apparatus comprising:

drawing return air into an air handling system, wherein said air handling system maintains environmental conditions of a facility comprising multiple rooms and a volume of air;

introducing ozone into said return air;

circulating said return air and said ozone through said air handling system;

returning said ozone and said return air to said volume of air; and controlling said circulating step and said introducing ozone step.

7. The method of claim 6, wherein said introducing ozone step is intermittent.

8. The method of claim 6, wherein said introducing ozone step is periodic.

9. The method of claim 8, wherein said period is from about 1 to 3 hours.

10. The method of claim 8, wherein said period is 2 hours.

11. The system of claim 2, wherein means for controlling activates said ozone generator twelve time or less times per twenty four hour period.

12. The system of claim 2, wherein said means for controlling activates said ozone generator only once every two hours.

13. The system of claim 1, wherein said ozone generator intermittently introduces at least 0.7 grams of ozone per cubic meter into said air stream.

* * * * *